(12) United States Patent
Lin et al.

(10) Patent No.: US 10,047,557 B2
(45) Date of Patent: Aug. 14, 2018

(54) SIDE PLATE PRESSING DEVICE FOR A VEHICLE CURTAIN

(71) Applicant: MACAUTO INDUSTRIAL CO., LTD., Tainan (TW)

(72) Inventors: Paul Lin, Tainan (TW); Hung-Ming Yen, Tainan (TW); Jen-Yi Liu, Tainan (TW)

(73) Assignee: MACAUTO INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 15/409,480

(22) Filed: Jan. 18, 2017

(65) Prior Publication Data

US 2018/0202223 A1 Jul. 19, 2018

(51) Int. Cl.
*E06B 9/42* (2006.01)
*B60J 1/20* (2006.01)

(52) U.S. Cl.
CPC .............. *E06B 9/42* (2013.01); *B60J 1/2013* (2013.01)

(58) Field of Classification Search
CPC . E06B 9/42; Y10T 24/45623; Y10T 24/45639
See application file for complete search history.

(56) References Cited

U.S. PATENT DOCUMENTS

| | | | | |
|---|---|---|---|---|
| 4,391,020 A * | 7/1983 | Hsu | ................ | E05F 1/066 16/314 |
| 5,123,147 A * | 6/1992 | Blair | ................ | A44B 11/2526 24/633 |
| 6,836,932 B2 * | 1/2005 | Yamamoto | ............. | B60N 3/023 16/110.1 |
| 7,103,939 B2 * | 9/2006 | Belchine, III | ........ | B60N 3/023 16/412 |
| 7,263,750 B2 * | 9/2007 | Keene | ................ | A44B 11/2526 24/265 B |
| 7,308,736 B2 * | 12/2007 | Nakazato | ............... | B60N 3/026 24/289 |
| 7,617,571 B2 * | 11/2009 | Lee | ......................... | B60N 3/023 16/412 |
| 7,988,115 B2 * | 8/2011 | Lee | ........................... | B60R 7/10 16/438 |
| 8,146,208 B2 * | 4/2012 | Kajio | ...................... | B60N 3/023 16/444 |
| 8,210,588 B2 * | 7/2012 | Boehner | ............... | B60N 3/023 16/418 |
| 8,245,353 B2 * | 8/2012 | Homner | ................ | E05F 1/1215 16/298 |

(Continued)

*Primary Examiner* — Jason W San
(74) *Attorney, Agent, or Firm* — Hershkovitz & Associates, PLLC; Abe Hershkovitz

(57) ABSTRACT

A side plate pressing device for a vehicle curtain has a positioning assembly and a buckle. The positioning assembly and the buckle are respectively mounted on a shaft and a side plate. A buckle unit is pivoted on the fixing base, and is positioned on one of a first position and a second position of the fixing base. When a curtain body is curled, the buckle and the buckle unit can be engaged with each other. A user can hold the side plate and press downward to pivot the buckle and the buckle unit downward. Then, the buckle unit can be positioned on the second position, and the side plate is drooping, so as not to obstruct the user from using a rear space of a vehicle.

4 Claims, 10 Drawing Sheets

(56) References Cited

U.S. PATENT DOCUMENTS

| | | | | |
|---|---|---|---|---|
| 8,245,357 B2* | 8/2012 | Kajio | .................... | B60N 3/023 |
| | | | | 16/444 |
| 8,266,764 B2* | 9/2012 | Costabel | ............... | E05F 1/1207 |
| | | | | 16/308 |
| 8,356,653 B2* | 1/2013 | Fu-Lai | .................... | E06B 9/322 |
| | | | | 160/170 |
| 8,549,707 B2* | 10/2013 | Macernis | .............. | E05F 1/1215 |
| | | | | 16/298 |
| 8,683,654 B2* | 4/2014 | Chen | .................... | E05D 11/087 |
| | | | | 16/298 |
| 8,745,820 B2* | 6/2014 | Janak | ........................ | E05F 3/12 |
| | | | | 16/50 |
| 9,062,494 B2* | 6/2015 | Chen | ........................ | E06B 9/60 |
| 2006/0130276 A1* | 6/2006 | Clark | ........................ | E05D 5/06 |
| | | | | 16/299 |
| 2007/0130735 A1* | 6/2007 | Diamond | ............... | A44B 11/24 |
| | | | | 24/636 |
| 2012/0080898 A1* | 4/2012 | Kajio | .................... | B60N 3/026 |
| | | | | 296/1.02 |
| 2013/0019437 A1* | 1/2013 | Takai | .................... | B60N 3/023 |
| | | | | 16/429 |
| 2013/0220561 A1* | 8/2013 | Yu | ........................... | E06B 9/322 |
| | | | | 160/340 |
| 2014/0075720 A1* | 3/2014 | Caffin | ................... | E05F 1/1215 |
| | | | | 16/298 |

* cited by examiner

SIDE PLATE PRESSING DEVICE FOR A VEHICLE CURTAIN

BACKGROUND OF THE INVENTION

1. Field of the Invention

The present invention relates to a side plate fixing device for a vehicle curtain, and more particularly to a side plate pressing device for a vehicle curtain which is applied for pressing an end of a side plate connected with the vehicle curtain to position the side plate when the vehicle curtain is curled.

2. Description of Related Art

A conventional vehicle curtain is applied for shading a rear space of the vehicle, and comprises a shaft having a retractor and a curtain body connected with the shaft. The curtain body can be pulled to be expanded from the shaft by the retractor, and be curled into the shaft automatically.

The conventional vehicle curtain needs to achieve requirements including that the curtain body can be pulled to be expanded from the shaft or be curled into the shaft, and the curtain body is expanded and then fixed on a side of the vehicle. Therefore, the conventional vehicle curtain further comprises a hard side plate connected with an end of the curtain body. The side plate has a hole formed in the side plate to be held by a user and two positioning units respectively mounted on two ends of the side plate. When the conventional vehicle curtain is assembled on the rear space of the vehicle, a retractable positioning structure of two ends of the shaft is inserted into two side walls in the rear space of the vehicle to be positioned. After the curtain body is pulled from the shaft to be expanded, the two positioning units of the side plate are respectively engaged with the side walls of the vehicle, such that the curtain body can be expanded to be fixed. The side plate extends toward the rear door of the vehicle, so the conventional vehicle curtain can provide a shielding effect for the rear space of the vehicle.

Although the conventional vehicle curtain provides the shielding effect for the rear space, the conventional vehicle curtain has a shortcoming. After the curtain body is curled into the shaft, the side plate cannot be folded into the shaft, but instead abuts the shaft and extends backward, such that the side plate occupies part of the rear space of the vehicle. Furthermore, the shaft will obstruct the user from accessing objects in the rear space.

SUMMARY OF THE INVENTION

The main objective of the present invention is to provide a side plate pressing device to resolve the abovementioned problems.

The side plate pressing device comprises a positioning assembly and a buckle.

The positioning assembly comprises a fixing base, a buckle unit comprising a body pivoted on the fixing base and an engagement portion formed on the body, a pivot inserted into the fixing base and the body, and an elastic fastener mounted between the fixing base and the buckle unit and selectively fastening the buckle unit to position the buckle unit on one of the first position and the second position of the fixing base. The buckle unit is pivoted relative to the fixing base between a first position and a second position of the fixing base. A first line is defined as a connection extending through a center of the first position and a pivoting center of the pivot. A second line is defined as a connection extending through a center of the second position and the pivoting center of the pivot.

The buckle comprises a buckle base and a hook, the hook formed on the buckle base and selectively and detachably catching the engagement portion. The buckle unit is positioned at the first position of the fixing base, and the hook extends along the second line.

Other objectives, advantages and novel features of the present invention will become more apparent from the following detailed description when taken in conjunction with the accompanying drawings.

DETAILED DESCRIPTION OF PREFERRED EMBODIMENT

Figure 1:
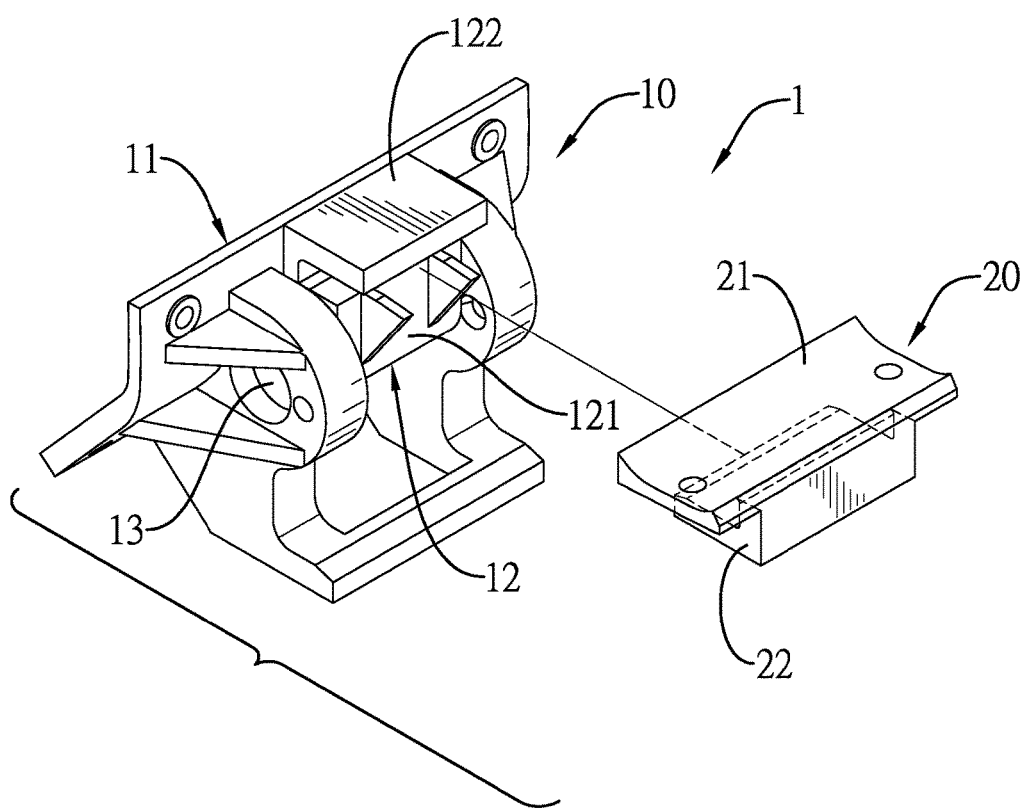
FIG. 1 is a partially exploded perspective view of a preferred embodiment of a side plate pressing device in accordance with the present invention.

With reference to FIG. 1, a preferred embodiment of a side plate pressing device 1 for a vehicle curtain in accordance with the present invention comprises a positioning assembly 10 and a buckle 20.

Figure 2:
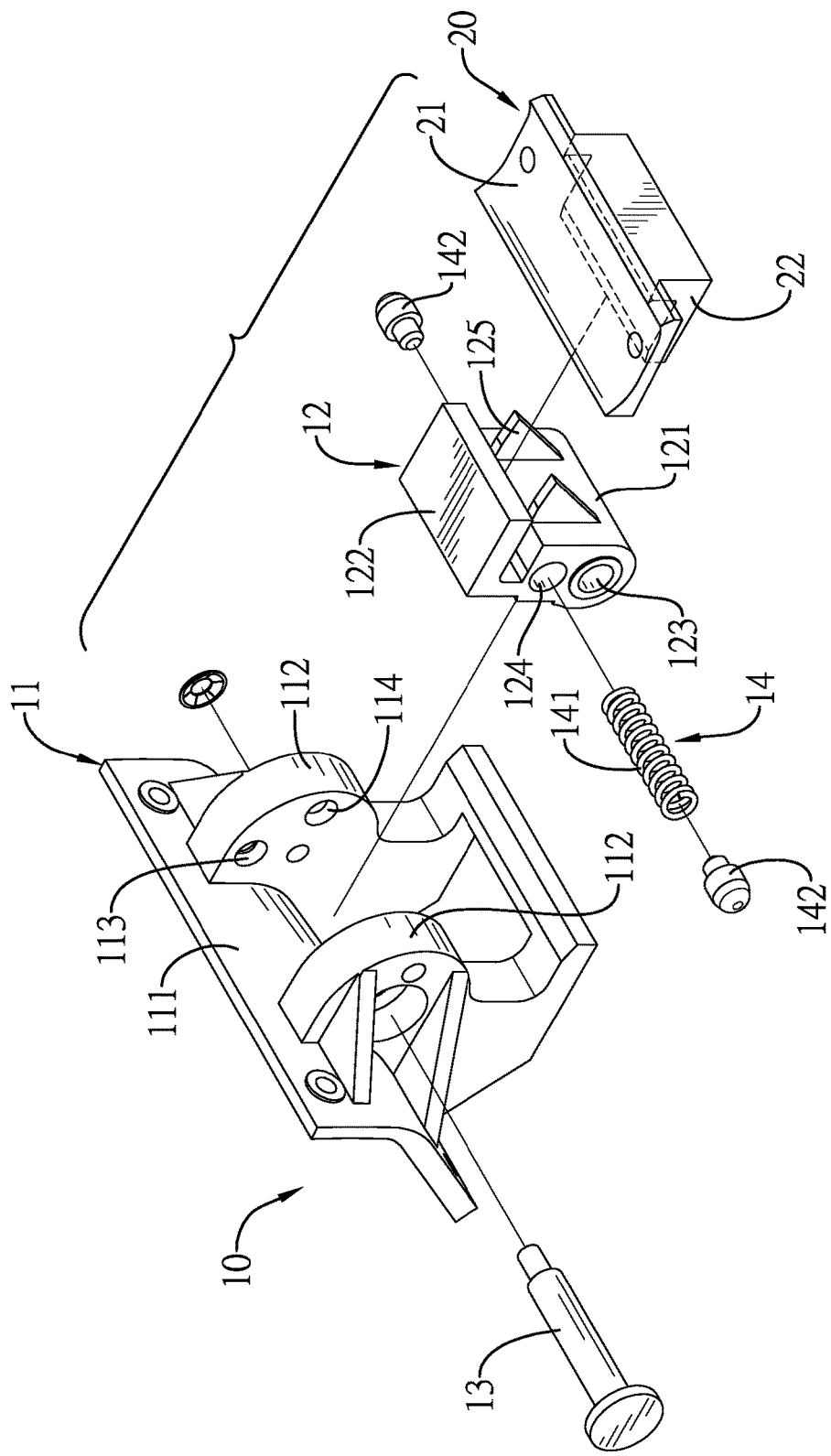
FIG. 2 is an exploded perspective view of the side plate pressing device in FIG. 1.
Figure 3:
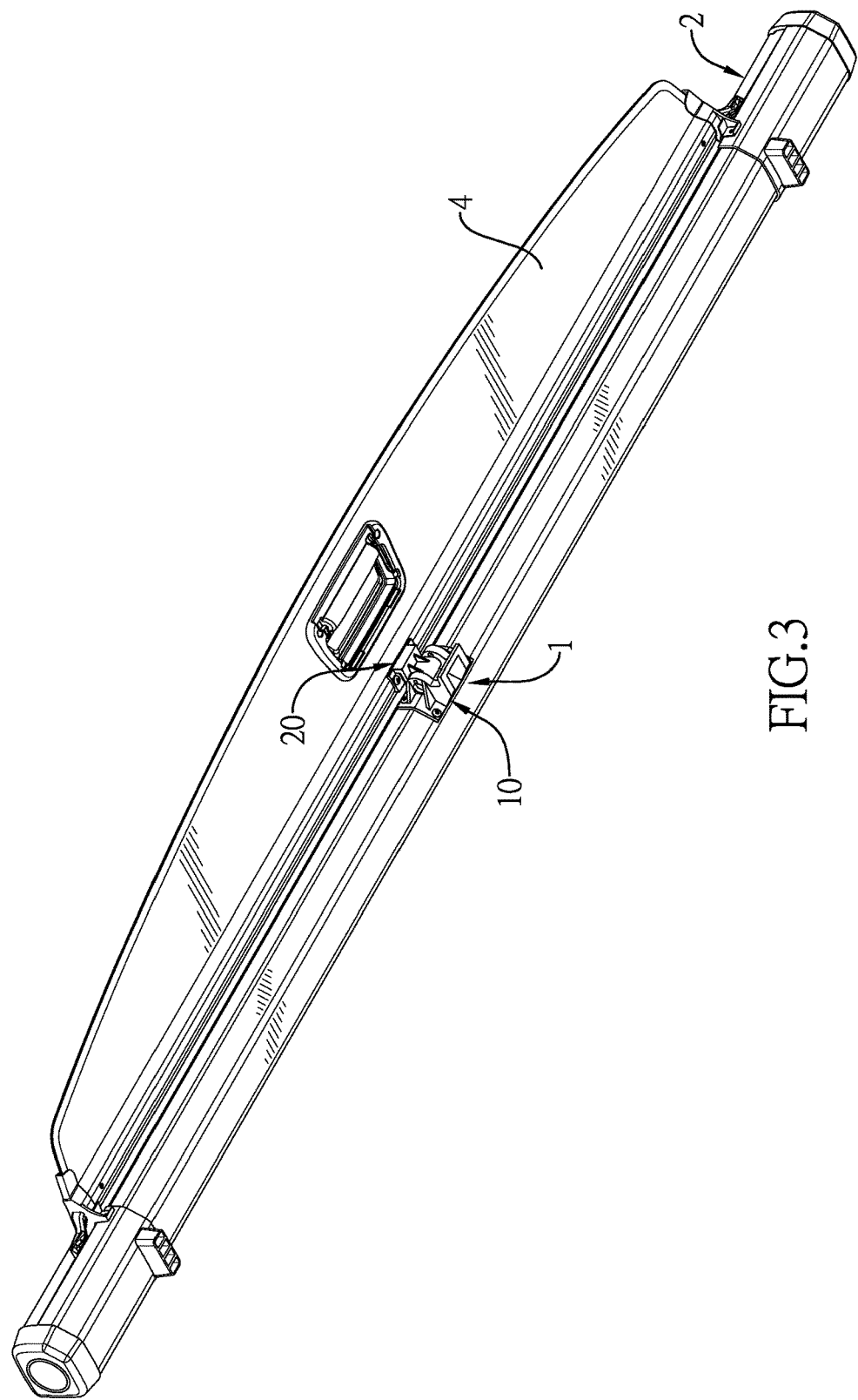
FIG. 3 is an operational perspective view of the side plate pressing device in FIG. 1 mounted on a shaft and a side plate of a vehicle curtain, wherein a curtain body is curled into the shaft.
Figure 4:
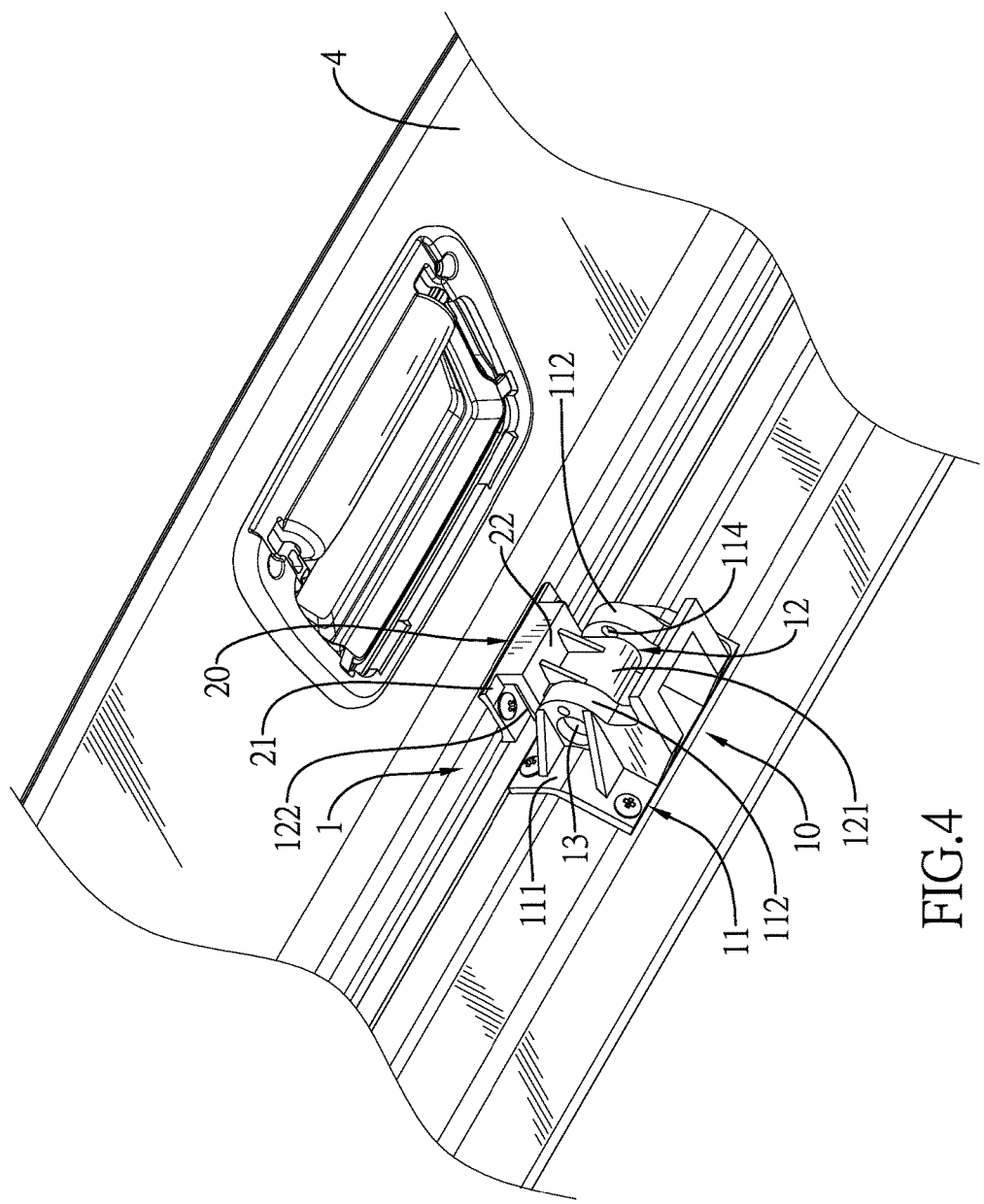
FIG. 4 is a partially enlarged perspective view of the vehicle curtain in FIG. 3.
Figure 5:
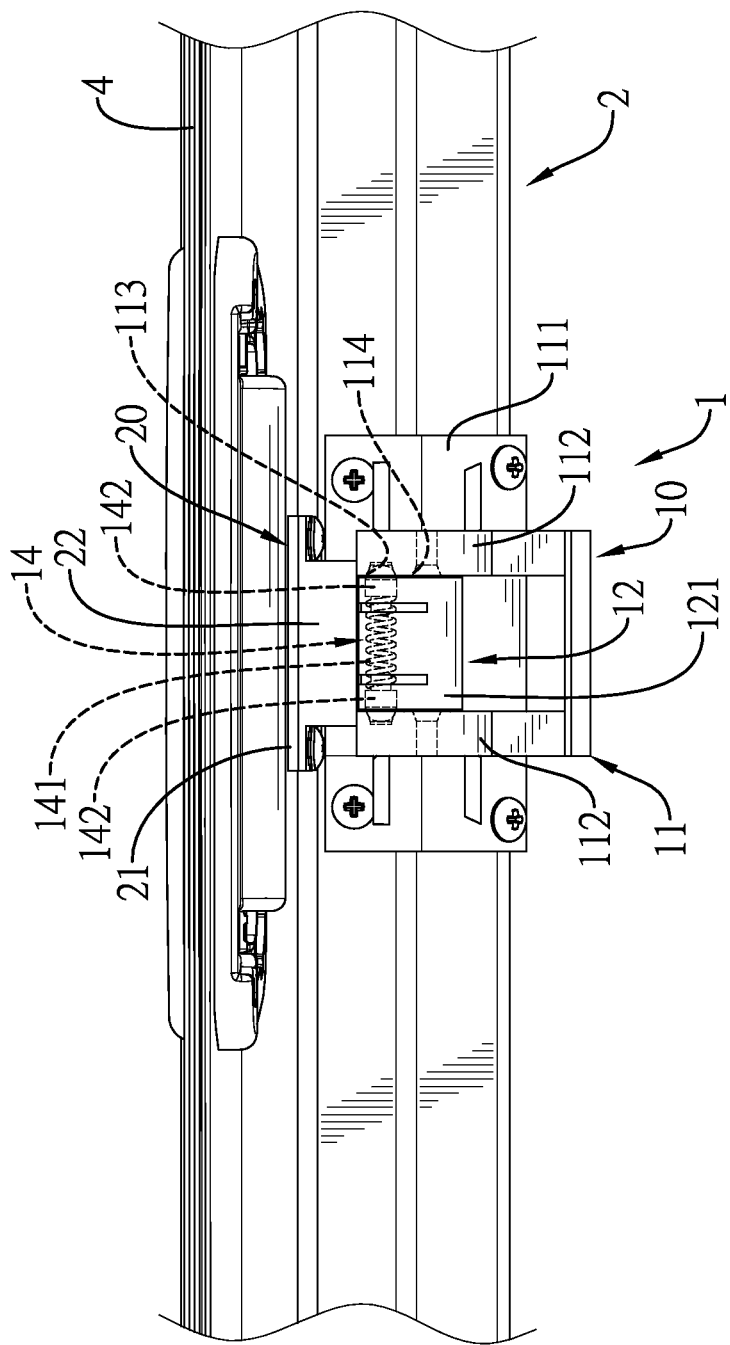
FIG. 5 is a partially enlarged front view of the vehicle curtain in FIG. 3.

With reference to FIGS. 1 and 2, the positioning assembly 10 comprises a fixing base 11, a buckle unit 12, a pivot 13, and an elastic fastener 14. The fixing base 11 comprises a fixing portion 111 and two pivoting portions 112 formed on the fixing portion 111 at a spaced interval. The buckle unit 12 comprises a body 121 and an engagement portion 122 formed on the body 121. The body 121 of the buckle unit 12 is mounted between the pivoting portions 112 of the fixing base 11, and the pivot 13 is inserted into the pivoting portions 112 and the body 121, such that the buckle unit 12 can be pivoted relative to the fixing base 11 between a first position and a second position. The elastic fastener 14 is mounted between the fixing base 11 and the buckle unit 12, and selectively fastens the buckle unit 12 to position the buckle unit 12 on one of the first position and the second position.

Figure 6:
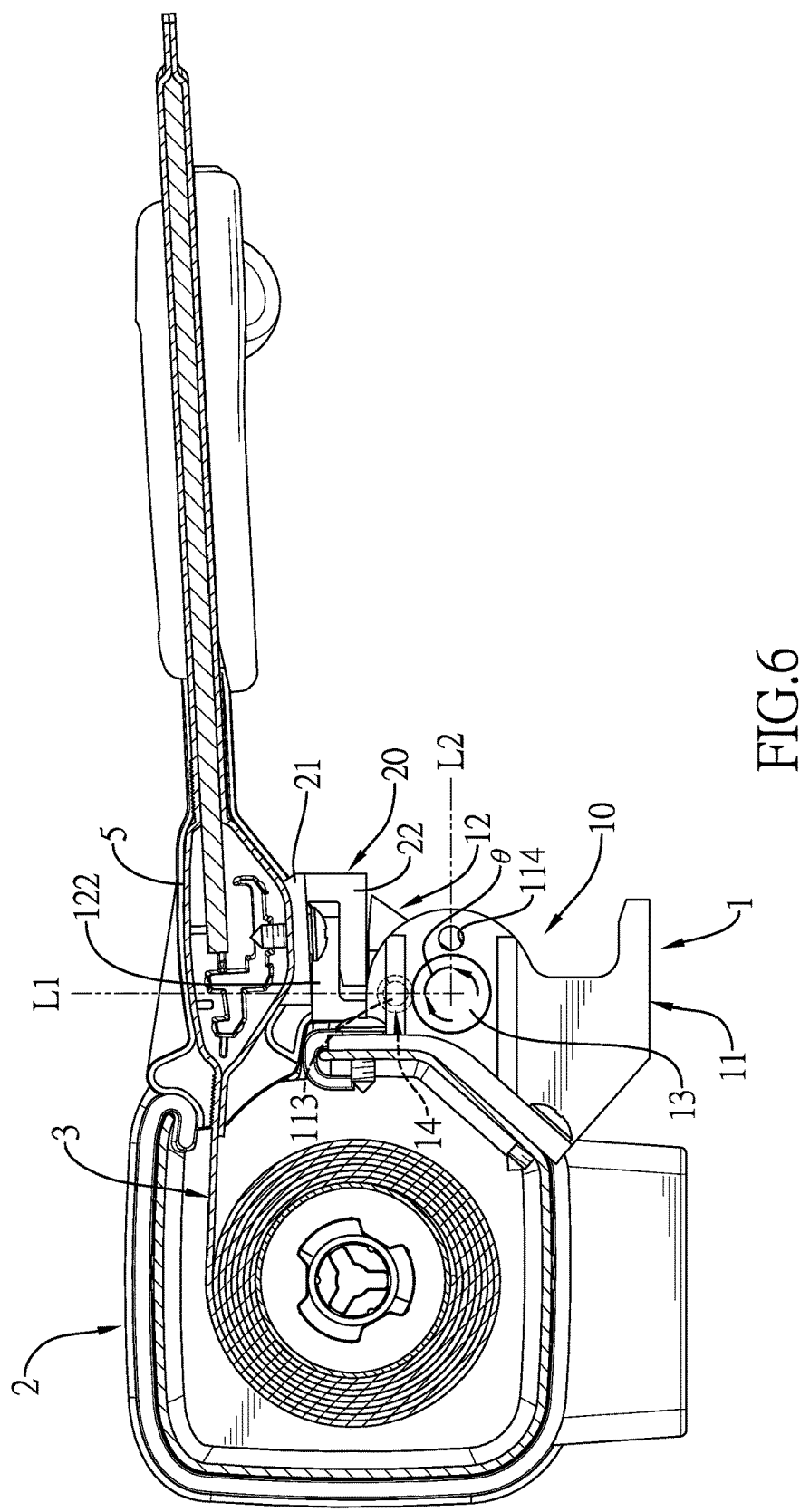
FIG. 6 is an enlarged side view in partial section of the vehicle curtain in FIG. 3.
Figure 7:
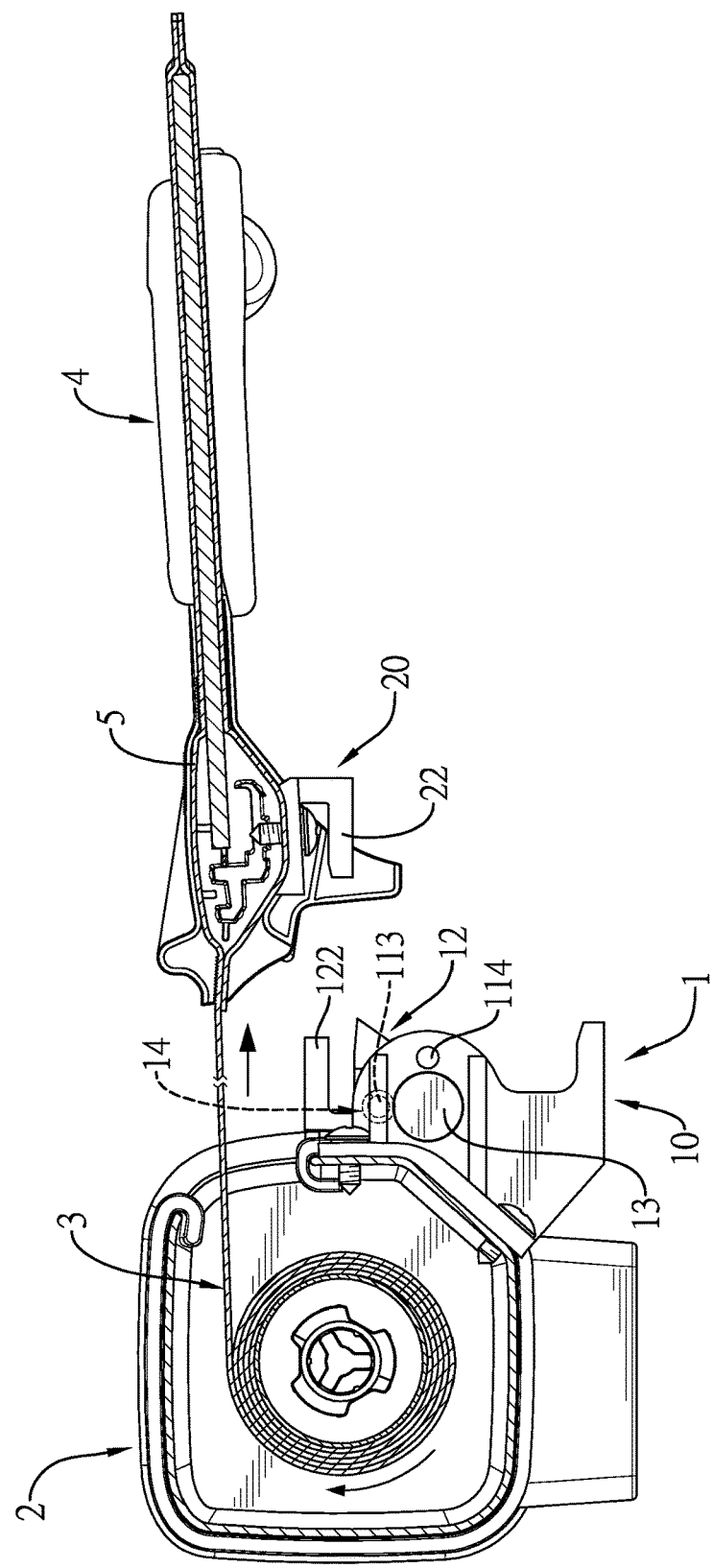
FIGS. 7 to 9 show operational side views in partial section of the vehicle curtain in FIG. 3.
Figure 8:
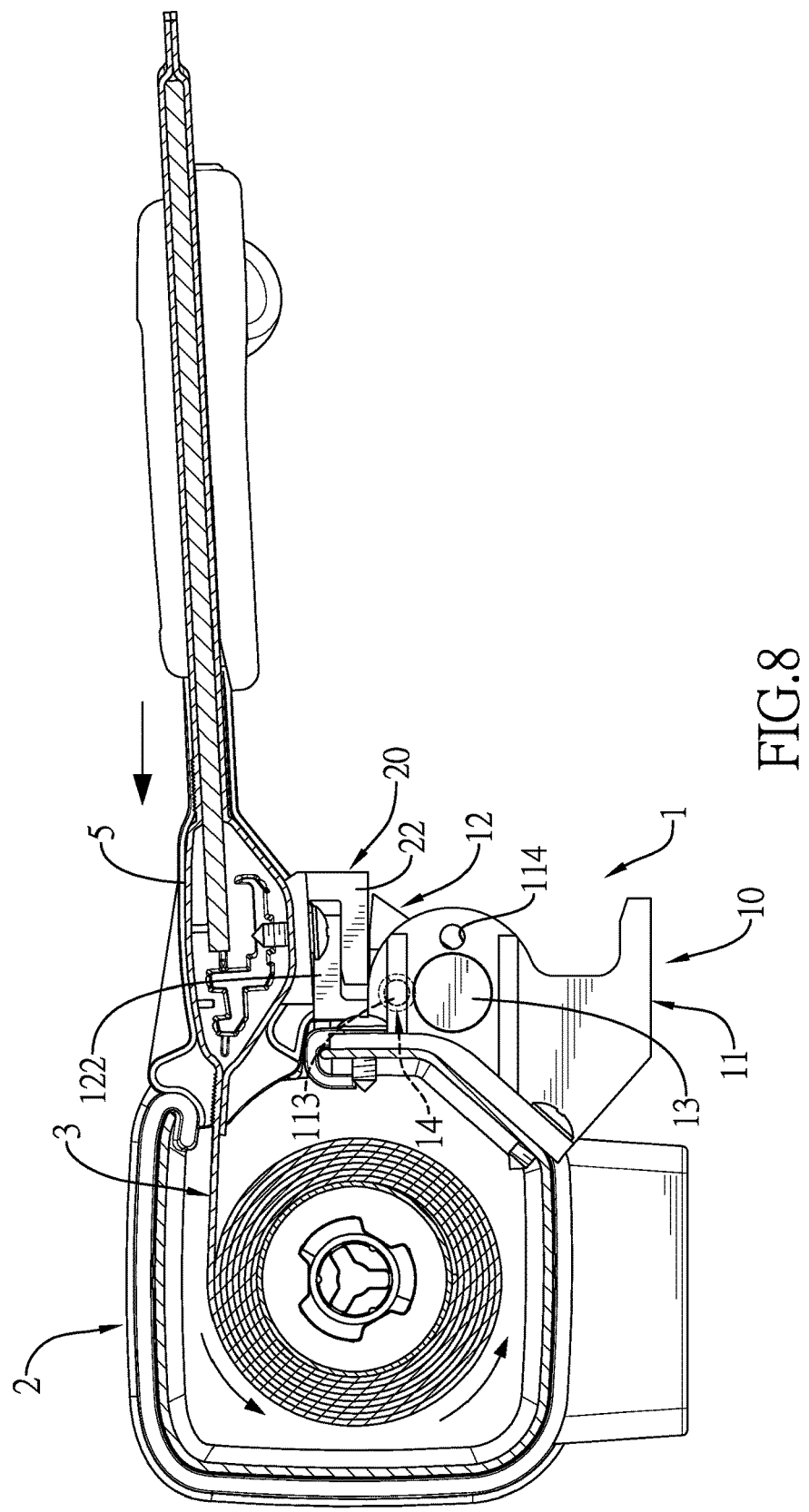

With reference to FIGS. 1 and 2, each pivoting portion 112 of the fixing base 11 has a first positioning recess 113 and a second positioning recess 114 both recessed in the pivoting portion 112. The first positioning recess 113 is defined as the first position, and the second positioning recess 114 is defined as the second position. With reference to FIG. 6, a first line L1 is defined as a conjunction extending through a center of the first positioning recess 113 and a pivoting center of the pivot 13. A second line L2 is defined as a conjunction extending through a center of the second positioning recess 114 and the pivoting center of the pivot 13. An angle θ is defined between the first line L1 and the second line L2, and is larger than or equal to 90 degrees and smaller than 120 degrees. The body 121 has a middle hole 123 and a through hole 124. The middle hole 123 and the through hole 124 are formed through the body 121 along two opposite sides of the body 121. The pivot 13 is inserted into the middle hole 123 of the buckle unit 12. The elastic fastener 14 comprises a compression spring 141 and two buckle blocks 142 respectively mounted on two ends of the compression spring 141. The elastic fastener 14 is mounted in the through hole 124. The two buckle blocks 142 are respectively located at two ends of the through hole 124 and are respectively slightly moveable at the two ends of the through hole 124. Each buckle block 142 is engaged in one of the first positioning recess 113 and the second positioning recess 114 of the pivoting portion 112.

With reference to FIGS. 1, 2, and 6, the buckle unit 12 further has a rib portion 125 formed on a side of the body 121. The buckle 20 comprises a buckle base 21 and a hook 22 formed on the buckle base 21, the hook 22 selectively supported by the rib portion 125, and selectively and detachably catching the engagement portion 122. When the buckle unit 12 is positioned at the first position of the fixing base 11, the hook 22 extends along the second line L2. When the buckle unit 12 is positioned at the second position of the fixing base 11, the hook 22 extends along the first line L1.

With reference to FIGS. 3 to 6, when the side plate pressing device 1 is applied on a vehicle curtain, the fixing base 11 is fixed on a shaft 2 and is below a curtain body 3. The buckle 20 is mounted on a bottom of a side plate 4. Preferably, the buckle 20 is mounted on a bottom of an edge portion 5 of the side plate 4 that is adjacent to an end of the curtain body 3. When the vehicle curtain connected with the side plate pressing device 1 is mounted in a rear space of a vehicle, two ends of the shaft 2 are inserted into and positioned on two side walls of the vehicle in the rear space adjacent to rear seats of the vehicle. With reference to FIGS. 3 to 5, and 7, a user can pull the side plate 4 to expand the curtain body 3 from the shaft 2. The buckle unit 12 is positioned at the first position, and the buckle 20 connected with the side plate 4 moves along the side plate 4 to be detached front the buckle unit 12 until the curtain body 3 is expended completely. Then, the two ends of the shaft 2 are positioned on the two side walls of the vehicle in the rear space, such that the curtain body 3 can be expanded to shield the rear space of the vehicle.

Figure 9:
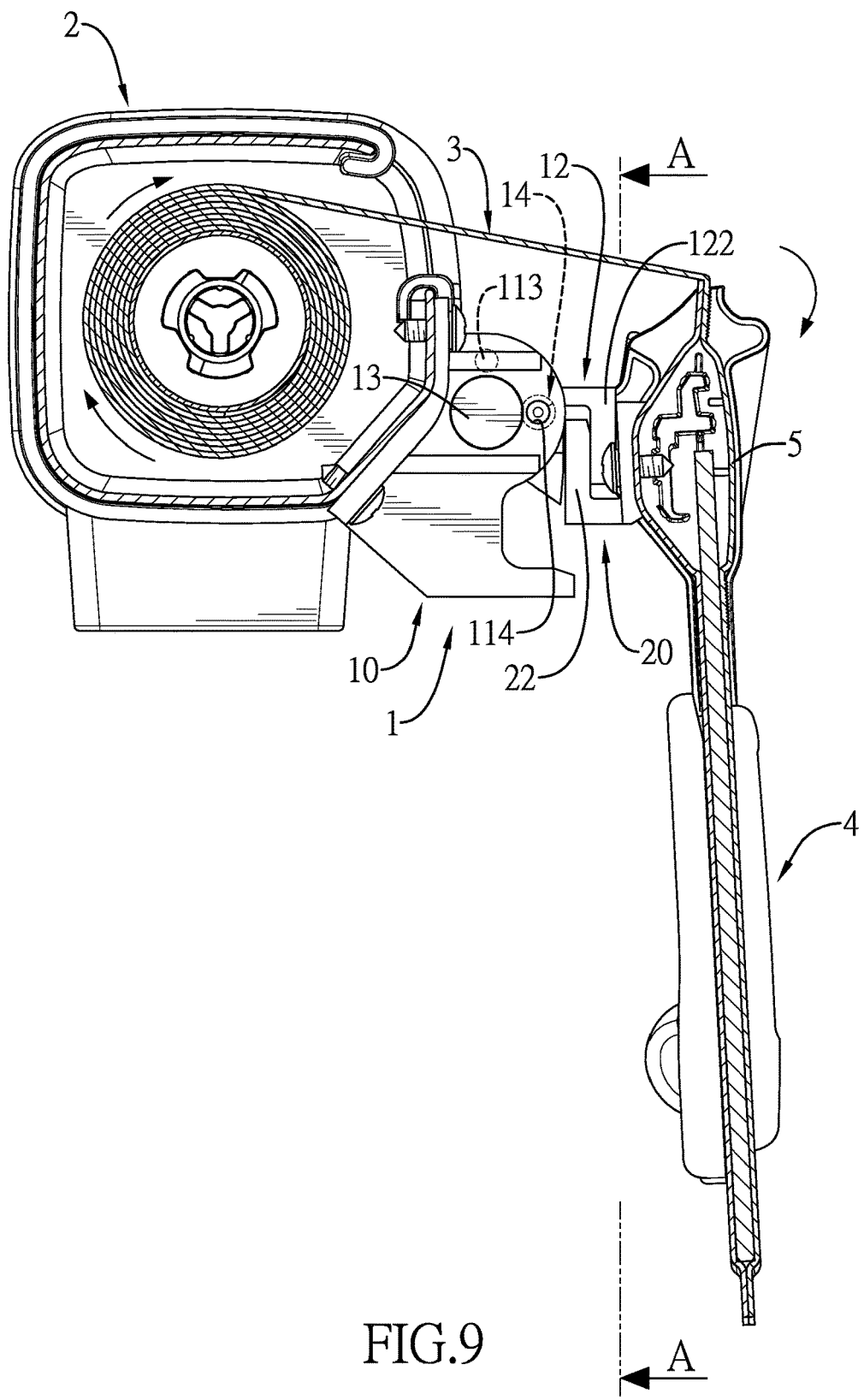
Figure 10:
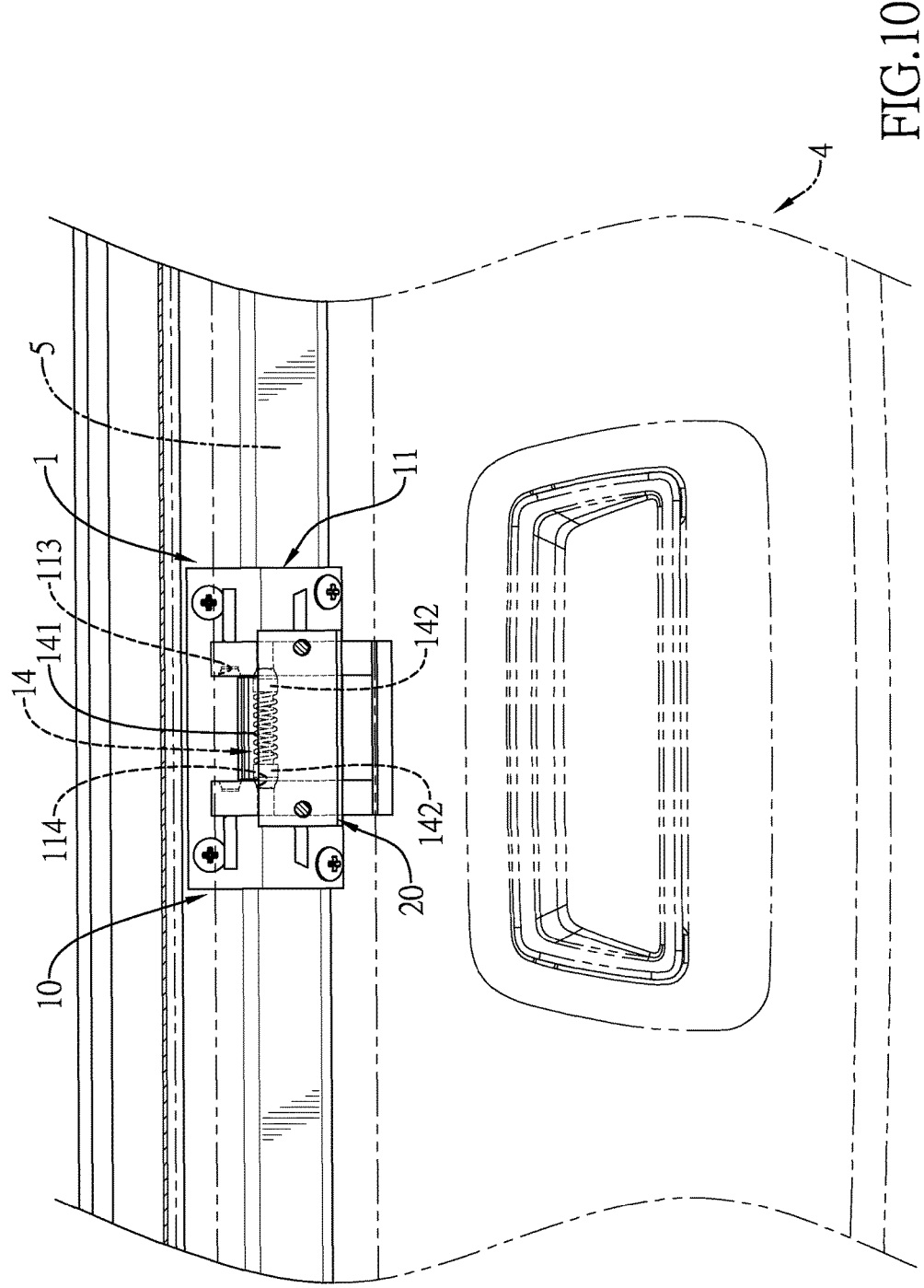
FIG. 10 is a front view in partial section of the vehicle curtain along line A-A in FIG. 9.

With reference to FIGS. 3 to 5, and 8, when the user wants to curl the curtain body 3, the user pulls the side plate 4 to detach the edge portion 5 from the two side walls in the rear space of the vehicle. A retractor inside the shaft 2 provides an automatic curling force for the curtain body 3. The user holds the side plate 4 to be moved along the curtain body 3 until the curtain body 3 is curled into the shaft 2 completely. Then, the edge portion 5 approaches the shaft 2, and the buckle 20 connected with the bottom of the side plate 4 is engaged with the buckle unit 12 mounted on the shaft 2. With reference to FIGS. 9 and 10, when the user applies a downward pressing force on the side plate 4, the buckle 20 is driven by the pressing force to drive the buckle unit 12 to be pivoted. The elastic fastener 14 will be detached from the first positioning recess 113, such that the side plate 4 will be drooping. With the elastic fastener 14 being positioned on the second position to make the side plate 4 drooping, the drooping side plate 4 will not obstruct the user from using the rear space of the vehicle.

With reference to FIG. 6, when the user wants to expand the curtain body 3 again, the user can hold and pivot the side plate 4 upward to detach the elastic fastener 14 from the second position until the hook 22 is substantially parallel with the second line L2. At the same time, the elastic fastener 14 is positioned on the first position, and then the user can hold the side plate 4 to expand the curtain body 3.

From the above description, it is noted that the present invention has the following advantages: The positioning assembly 10 and the buckle 20 can be respectively mounted on the shaft 2 and the bottom of the side plate 4, and the buckle unit 12 can be engaged with the buckle 20. When the curtain body 3 is curled into the shaft 2, the buckle 20 can be engaged with the buckle unit 12 automatically. Then, the user holds the side plate 4 to pivot the side plate 4 downward, such that the elastic fastener 14 can be positioned on the second position. At the same time, the side plate 4 is drooping and is kept from obstructing the user from using the rear space of the vehicle. When the user wants to expand the curtain body 3, the user can hold and pivot the side plate 4 upward to detach the elastic fastener 14 from the second position. The buckle 20 can be detached from the buckle unit 12, and the curtain body 3 can be expanded. Therefore, an operation of the side plate pressing device 1 is simple and easy.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A side plate pressing device for a vehicle curtain including:
   a positioning assembly comprising:
   a fixing base including
   a fixing portion; and
   two pivoting portions formed on the fixing portion at a spaced interval, each pivoting portion having a first positioning recess recessed in the pivoting portion and a second positioning recess recessed in the pivoting portion, wherein the first positioning recess is defined as a first position, and the second positioning recess is defined as a second position;
   a buckle unit comprising a body mounted pivotally on the fixing base and an engagement portion formed on the body, the body of the buckle unit being mounted between the pivoting portions of the fixing base, the body of the buckle unit having a middle hole and a through hole, wherein the middle hole and the through hole are respectively formed through two opposite sides of the body;
   a pivot inserted into the pivoting portions of the fixing base and the middle hole of the body to pivotally connect the buckle unit with the fixing base between the first position and the second position, wherein a first line is defined as a conjunction extending through a center of the first position and a pivoting center of the pivot, and a second line is defined as a conjunction extending through a center of the second position and the pivoting center of the pivot;
   an elastic fastener mounted in the through hole of the body between the fixing base and the buckle unit, selectively fastening the buckle unit to position the buckle unit on one of the first position and the second position, and including
a compression spring;
two buckle blocks respectively mounted on two ends of the compression spring, respectively located at two ends of the through hole and respectively slightly moveable at the two ends of the through hole, wherein each buckle block is engaged in one of the first positioning recess and the second positioning recess of the pivoting portion;
a buckle comprising
a buckle base; and
a hook formed on the buckle base and selectively and detachably catching the engagement portion, wherein when the buckle unit is positioned at the first position of the fixing base, the hook extends along the second line.

2. The side plate pressing device as claimed in claim 1, wherein
an angle is defined between the first line and the second line, and is larger than or equal to 90 degrees and smaller than 120 degrees.

3. The side plate pressing device as claimed in claim 1, wherein the buckle unit further has a rib portion formed on a side of the body to selectively support the hook.

4. The side plate pressing device as claimed in claim 2, wherein the buckle unit further has a rib portion formed on a side of the body to selectively support the hook.

\* \* \* \* \*